Oct. 2, 1956

F. H. WILSHAW 2,765,034

SHEARING DIES COMPRISING STRIP MEMBERS
WHICH OVERLAP WHERE SHARP BANDS OCCUR

Filed Sept. 24, 1953

INVENTOR.
FRED HOLLAND WILSHAW
BY Moorn y Hall,
ATTORNEYS

Oct. 2, 1956 F. H. WILSHAW 2,765,034
SHEARING DIES COMPRISING STRIP MEMBERS
WHICH OVERLAP WHERE SHARP BANDS OCCUR
Filed Sept. 24, 1953 5 Sheets-Sheet 2

INVENTOR.
FRED HOLLAND WILSHAW

BY *Moore of Hall,*

ATTORNEYS

Oct. 2, 1956  F. H. WILSHAW  2,765,034
SHEARING DIES COMPRISING STRIP MEMBERS
WHICH OVERLAP WHERE SHARP BANDS OCCUR
Filed Sept. 24, 1953  5 Sheets-Sheet 3

INVENTOR.
FRED HOLLAND WILSHAW
BY Moore and Hall,
ATTORNEYS

Oct. 2, 1956

F. H. WILSHAW 2,765,034

SHEARING DIES COMPRISING STRIP MEMBERS
WHICH OVERLAP WHERE SHARP BANDS OCCUR

Filed Sept. 24, 1953

*INVENTOR.*
FRED HOLLAND WILSHAW

BY

*ATTORNEYS*

Oct. 2, 1956

F. H. WILSHAW 2,765,034

SHEARING DIES COMPRISING STRIP MEMBERS
WHICH OVERLAP WHERE SHARP BANDS OCCUR

Filed Sept. 24, 1953

*INVENTOR.*
FRED HOLLAND WILSHAW

BY Moore and Hall,

ATTORNEYS

United States Patent Office 2,765,034
Patented Oct. 2, 1956

2,765,034

SHEARING DIES COMPRISING STRIP MEMBERS WHICH OVERLAP WHERE SHARP BENDS OCCUR

Fred Holland Wilshaw, Stockport, England, assignor, by mesne assignments, to Malew Engineering Ltd., Ronaldsway, Isle of Man, Great Britain, a British company Application September 24, 1953, Serial No. 382,163

Claims priority, application Great Britain September 25, 1952

5 Claims. (Cl. 164—33)

This invention relates to press tools for blanking articles from sheet material, such as metal, and to blanking dies of the kind hereinafter referred to, comprising male and female die parts each consisting of a base, such as hard plywood, having raised and recessed portions respectively cut to the required complementary male and female shapes having the shear edges of such shapes formed by facings of hardened steel strip in the form of inserts which extend through to the back of the base.

The present invention presents a completely new method and technique for quick and economical tooling of good accuracy and life in engineering press work including blanking, punching and piercing of metal or non-metallic sheet material. Blanking and piercing dies made according to the invention can also accomplish limited forming to be carried out in the same operation, such as, countersinking of holes, fluting, embossing, etc., usually as simultaneous operations.

By using a tool holder, dies may be set up on the press in five minutes. It may be stated that so far as these tools are concerned, most jobs normally routed may be blanked and that, where normal press blanking methods are employed, these dies will reduce tooling costs, and represent large savings in tooling times.

In this specification and the appended claims the term "blanking" is intended to include any die which is adapted to form an internal or an external contour on a metal workpiece, such dies being known as piercing, stamping, notching, cropping, embossing and forming dies.

In one preferred form, the invention is particularly applicable to blanking dies of the kind adapted to blank a succession of shapes from a strip.

Blanking die parts have hitherto been made by forming saw cuts in the base block to hold the inserts as if cutting a stencil, that is to say leaving bridge portions so that the strength and the integrity of the base block is retained. All centre or core portions, for example, of the shape to be blanked, remain attached to the surrounding body portion, the insert being notched from its back edge, to correspond to such bridge portions. This method of construction followed and was evolved from the previously existing practice for the manufacture of so-called knife-edge dies used for cutting shapes from paper, card or other relatively thin sheet material, the evolution being based upon the appreciation that by the selection of a particular relatively inert base material, for example so-called improved wood (i. e. highly compressed laminated veneer) or a material having similar properties, sufficient support would be given to the insert to enable male and female blanking die parts to be made.

Blanking dies of the kind referred to are used for many purposes, such as for the blanking of component parts of aircraft, electrical equipment, and the like, and experience in connection with such use has shown that with certain shapes the ordinary expectation of life for such dies may be shortened unduly by "bursting" of the female die part at the angles or corners. Obviously, while it is possible to form the hardened strip insert or "rule," as it is called, to reasonably sharp bends, the ends of such shapes as a T section have to be made from separate inserts to provide the required sharp angle and consequently such end insert does not receive any support from the side inserts to resist outward pressure, nor do the side inserts receive any help from the end insert.

Further with such dies, in order to save time and material, means are provided for positioning or "indexing" the strip so that after each blanking operation, the strip may be advanced to its position for blanking the next shape with minimum expenditure of time and with a minimum marginal gap necessary to ensure a clean blank. Hitherto, such indexing has been effected from the aperture produced by the preceding blanking operation, a stop being provided in or adjacent the dies. The above method is also used where the shapes are irregular and where the blanks are so spaced in the strip that the latter may be turned over, or end to end, and passed a second time through the die. By such means it is necessary either that the operator lift the strip after each blanking operation in order to clear the margin of the preceding aperture from the stop, or such stop must be retractable.

One object of the present invention is to improve the construction of such dies, in the first place to overcome weakness of the notched portions of the rule and in the second place to strengthen the base against bursting as aforesaid. This is obtained by appreciation of the relatively inert nature of such base material as improved wood to atmospheric condition and by appreciation of a possible way of obtaining reinforcement of the base from the rule inserts themselves. Experiment has in fact shown that "core" portions of a blanking die do not have to be attached to the main portion by "bridges" as in a stencil. The cut, to receive the steel rule, if so dimensioned relative to the thickness of the rule that the rule will be a reasonably tight fit between the core and the body, may be continuous so that the core is completely severed. Thereafter, the relatively inert nature aforesaid of the material of the base avoids any risk of contraction causing such core to come loose, or to fail to give the required lateral support to the inserts, or of swelling causing undue internal stresses within the die. Also the reasonably tight fit aforesaid provides frictional resistance to movement of the inserts in the cut which resistance may be used to assist reinforcement of the body part by the insert.

As a subsidiary object of the invention there is provided an improved method of, and means for indexing a work-piece in such dies, and this is based upon an appreciation that lateral location and alignment of the workpiece can be provided while permitting temporary disalignment in one direction and defining alignment only in the other rotational sense.

According to the present invention a press tool for blanking articles from sheet material comprises in combination a male die part, and a female die part, in which each of said die parts consists of physically unconnected base portions of such respective thicknesses as to combine to form the required complementary male and female shapes between which are held strip members which constitute facings and shear edges for said shapes.

According to a further feature of the invention, the blanking die aforesaid is further characterised in that one of the strip members overlaps another thereof, where sharp bends occur in said shapes, to form said bends, the overlap being accommodated in the body of the die part beyond and adjacent said bend.

Further, the dies are preferably provided with lateral locating formations in at least one edge of the strip and staggered alignment guides are provided for the strip, one of which is adapted to be engaged consecutively by said locating formations at one edge of the strip and the other of which is adapted to be engaged relatively with the other edge of the strip, whereby the strip may be positioned for each blanking operation by a notch engagement, and it is necessary to apply a rotational force in one direction and disengaged for advancement by a small rotational movement in the other direction.

The invention will be described further, by way of example, with reference to the accompanying drawings, in which.

Figure 1:
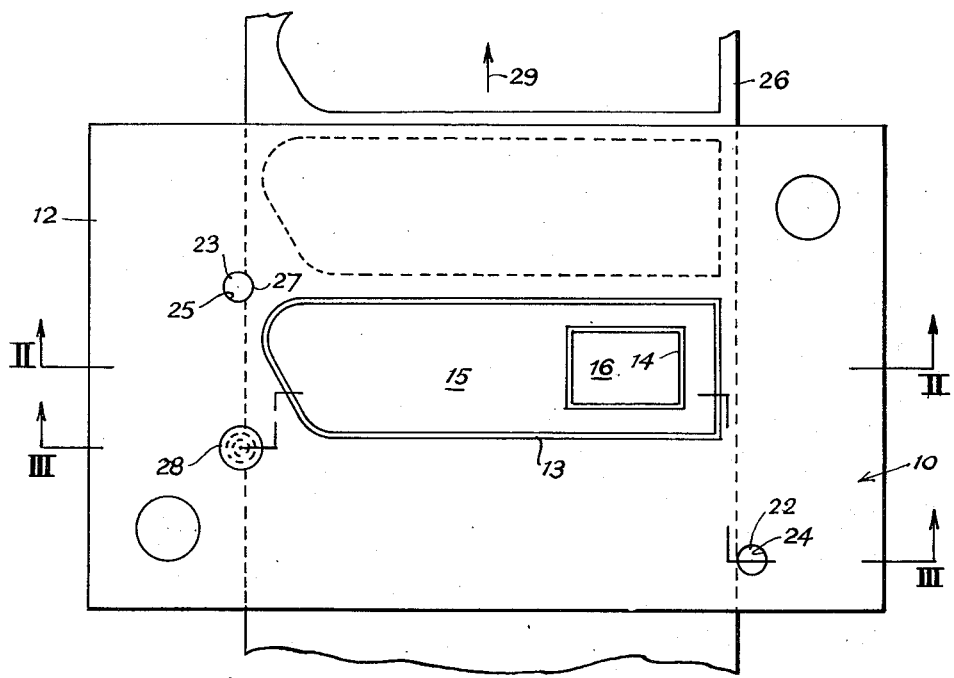
Fig. 1 is a plan view of a blanking die constructed in accordance with the present invention.
Figure 2:
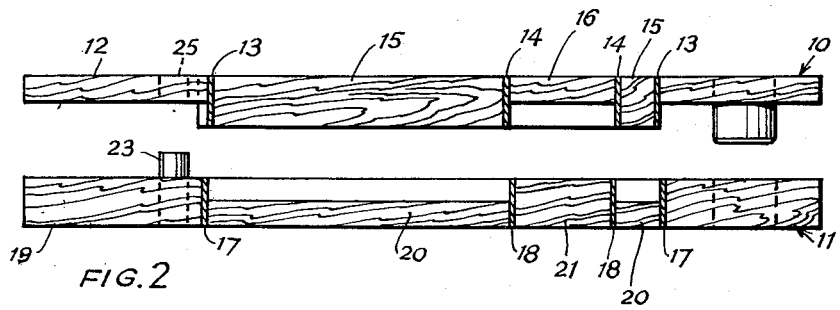
Fig. 2 is a sectional side elevation of the blanking die, taken on the line II—II of Fig. 1.
Figure 3:
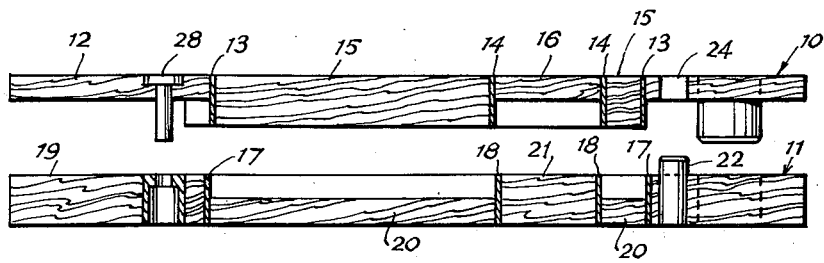
Fig. 3 is a sectional side elevation of the blanking die, taken on the line III—III of Fig. 1.

Referring now to Figs. 1 to 3, the blanking die illustrated is adapted for cutting blanks which are in the form of an elongated D, and comprises an upper or male die part 10 and a complementary lower or female die 11. The two die parts are secured, in the usual manner, to the platens of a press.

The upper die part 10 comprises a rectangular base, shown generally at 12 which is slotted throughout its thickness to receive a hardened steel strip insert (hereinafter called "rule" inserts) 13. At no point is the slot bridged, and the rule insert 13 is of constant width throughout, no cutaway portions being provided to give integrity to the base 12, as are usually provided. In effect, therefore, in order to accommodate the rule 13, a centre or core portion 15 is cut away from the base-board which corresponds to the inner peripheral shape of the rule 13.

The thickness of the core 15 is equal to the width of the rule insert 13, the base 12 being planed to a smaller thickness after removal of the core.

By virtue of its abutting relationship therewith, the core serves to reinforce the whole of the width of the insert 13 during the blanking processes, whilst at the same time locating the insert 13 into the baseboard 12.

In its turn, the core 15 is slotted to accommodate a further rule insert 14. Again, no bridge pieces are provided, and a second core 16 is produced by the slotting of the core 15 which before being replaced is planed to a thickness equal to the thickness of the baseboard 12. The rule insert 14 is located with respect to the core 15 by the core 16. The insert 14 at its outer peripheral edge abuts tightly with the core 15 which also serves as a reinforcement for the whole of the width thereof during blanking.

The lower die part 11 is a complementary structure to the upper part 10 and has rule inserts 17, 18 located in slots in a baseboard 19 by cores 20, 21. The plug 20 is planed to a thickness equal to the thickness of the baseboard 12 of the upper die part 10, whilst the baseboard 11 and the core 21 are equal in thickness to the widths of the rule inserts 13, 14, 17 and 18. Thus, the sides of the rules 17 are reinforced across the whole of their widths, by virtue of their abutting relationships with baseboard 19 and the core 21.

In this form, the dies are extremely effective, and such a die constantly used proved very efficient. It is to be noted that each die can be made up quite quickly, since none of the difficulties encountered in forming bridge-pieces in the base and corresponding cut-away portions in the rule inserts, are present.

As a further refinement, the die shown in Figs. 1 to 3 has a pair of staggered fixed guide pegs 22, 23 located on the lower die 11 and complementary sockets 24, 25 respectively are provided on the upper die 10. The peg 22 is disposed so that one edge of a sheet-steel work piece 26 abuts thereagainst, whilst the peg 23 is adapted to form a stop onto which may engage a notch 27 which is propagated in the opposite edge of the sheet during a previous blanking operation by a punch 28.

Thus, as the workpiece is advanced between the dies in the direction of the arrow 29 at each blanking operation, it is necessary to disengage one notch 27 from the peg 25 before forwarding. As the workpiece is advanced, the next notch 27 will engage the peg 25 and thus locate the workpiece once again for the next blanking operation.

Figure 4:
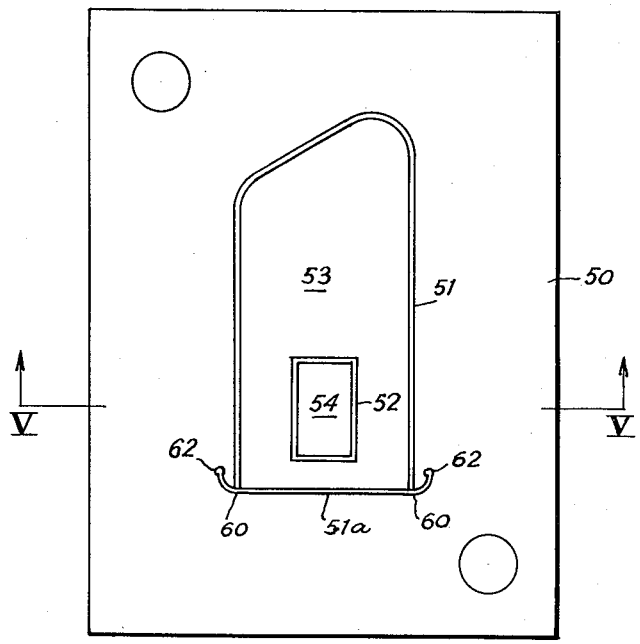
Fig. 4 is a plan view of another embodiment of the invention.
Figure 5:
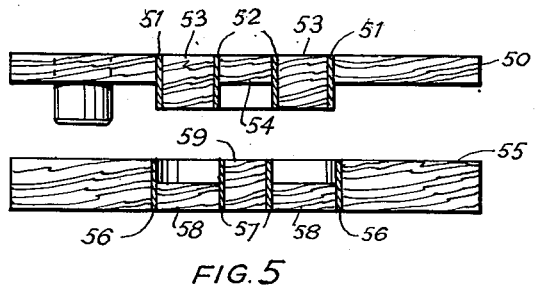
Fig. 5 is a sectional side elevation taken on the line V—V of Fig. 4.

Referring now to Figs. 4 and 5, the die here shown is similar to that shown in Figs. 1 to 3, but one of the inserts is differently formed. In this case, an upper or male die part 50 is cut to receive rule inserts 51, 51a and 52 and cores 53 and 54, whilst a lower or female die part 55 is cut for the reception of further corresponding rule inserts 56 and 57 and cores 58 and 59.

The thicknesses of the baseboards 50, 55, the rule inserts 51, 51a, 52, 56 and 57 and the cores 53, 54, 58 and 59 are similar to the corresponding parts in the die shown in Figs. 1 to 3, and the rule inserts are located, as before, by the cores which serve as reinforcements.

The rule insert 51, 51a, however, is made in two parts, as shown, in order to avoid weakness at the sharp junctures 60, 60 therebetween, and the rule part 51a extends past the ends of the rule part 51 to curve into shallow U-shaped extensions so as to overhang the part 51. The ends of the rule part 51a terminate in holes 62 and, in the assembly of the die, this hole is subsequently filled with a plug of wood, metal, or other suitable material. The U-shaped extensions provide further reinforcement for both the rule parts 51, 51a and prevent bursting of the die during blanking.

Various methods of ejection of the sheared blank, slugs and the like may be employed including rubber pads, rod ejectors, ejector plate, compressed air, positive push-through member and the like.

Figure 6A:
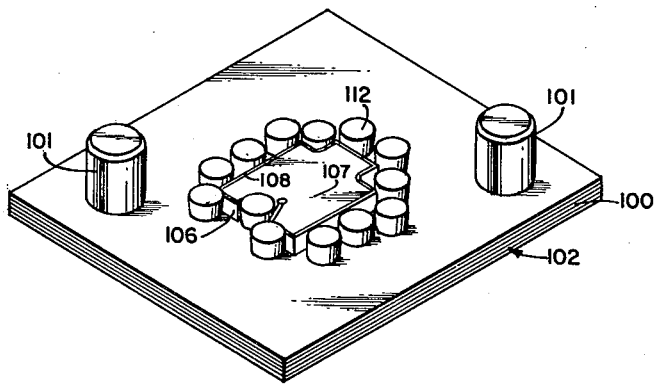
Fig. 6A is a perspective view of a male die portion cooperating with Fig. 6.
Figure 6:
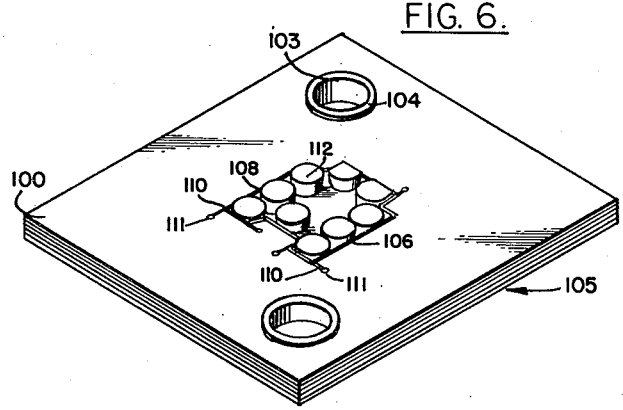
Fig. 6 is a perspective view of a female die portion made according to the invention.
Figure 7:
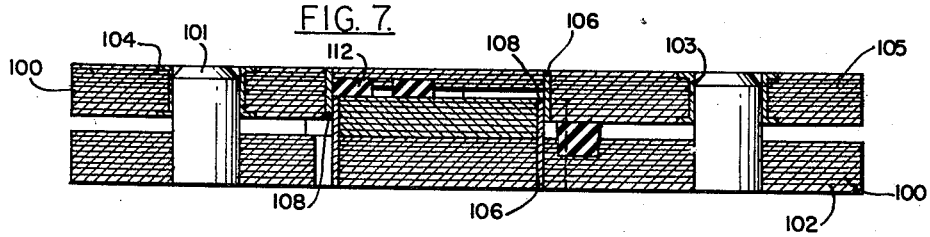
Fig. 7 is a sectional view along line 7—7 of Figures 9 and 12.
Figure 8:
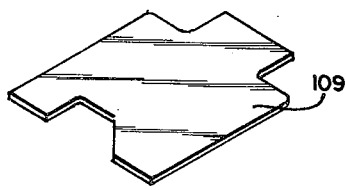
Fig. 8 is a perspective view of a blank stamped from sheet metal by the die of Figs. 6 and 6A.
Figure 9:
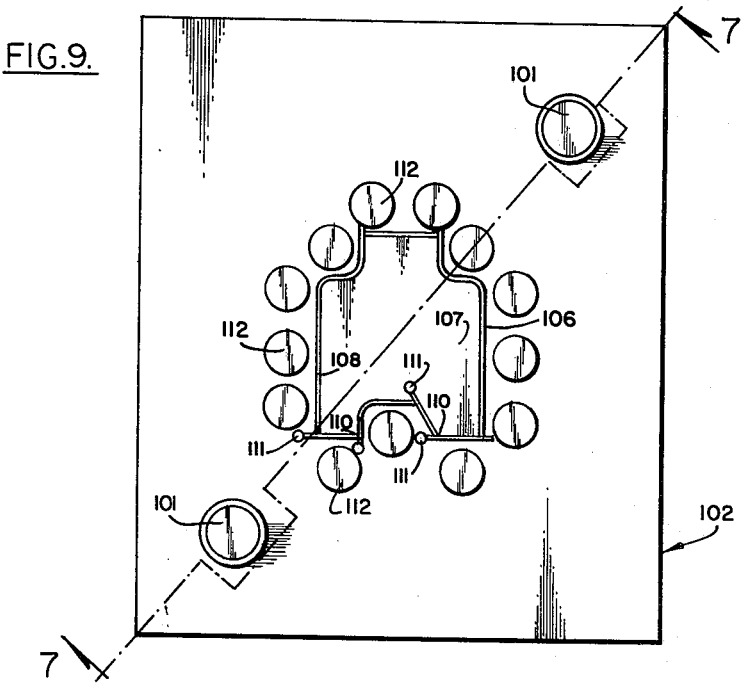
Fig. 9 is a plan view of one side of the male die of Fig. 6A.
Figure 10:
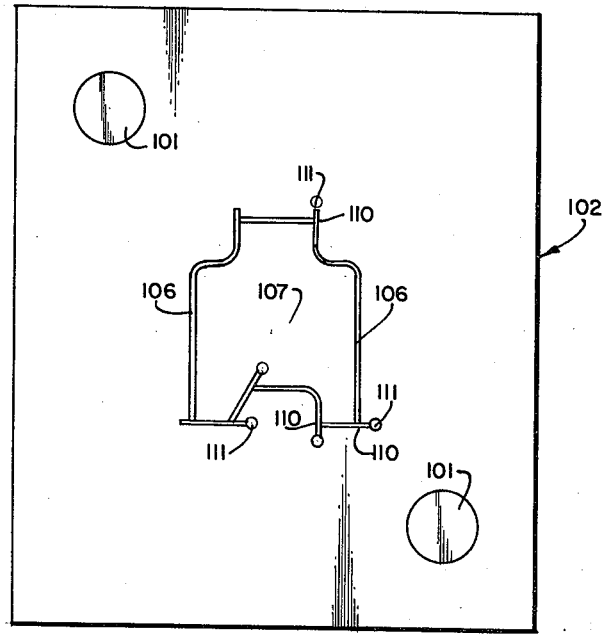
Fig. 10 is a plan view of the reverse side of the male die of Fig. 6A.
Figure 11:
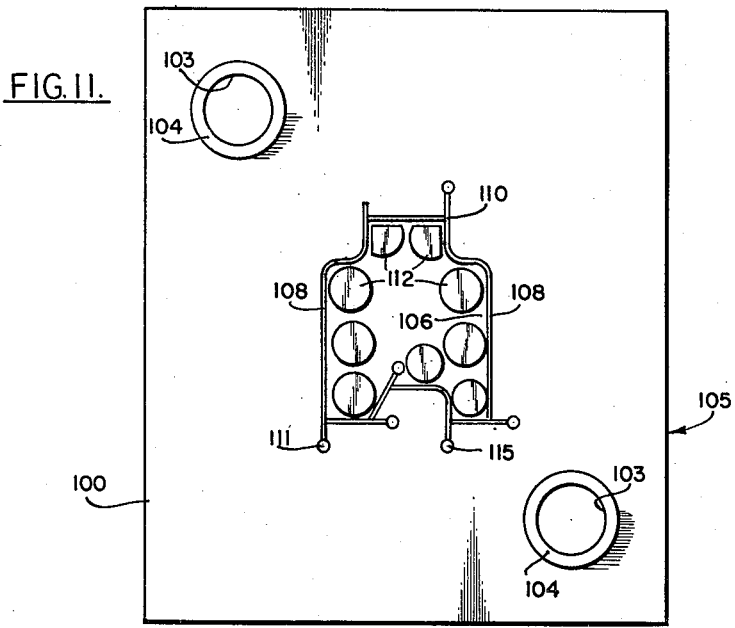
Fig. 11 is a plan view of one side of the female die of Fig. 6.
Figure 12:
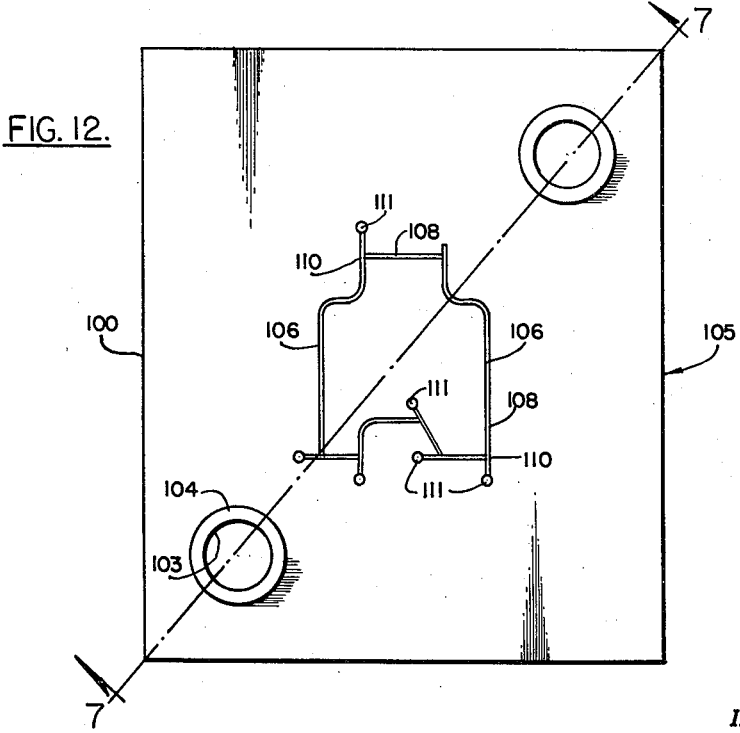
Fig. 12 is a plan view of the reverse side of the female die of Fig. 6.

Figs. 6 and 6A show respectively a female and male shearing die made according to the invention. The body 100 is preferably constructed of hard wood laminations as shown in Fig. 7, firmly adhered into a strong structure. Guide pins 101 on male part 102 ride in ferrules 103 flanged as at 104 in female portion 105. Hardened steel edgings 106 are nicely fitted into saw cuts in the laminated structure and extend all the way through to carry the major part of the shearing load and transmit it directly to the press itself. Edging 106 surrounds the raised punch portion 107 and is ground flush therewith as at 108. This edge 106 may be hollow ground on the inside thus allowing the steel to appear to project slightly above the support 107 and still fall within the concept of a flush ground shearing edge, but the edging 108 should not stand proud of the die. The flush ground shearing edge 108 as shown in Figs. 6–12 greatly increases the life of the die, the accuracy with which it can be designed and the gauge of the sheet metal which can be stamped successfully.

The die shown in Figs. 6 and 6A will produce the blank 109 in a wide variety of materials with a clean cut and to within a thousandth of an inch. Not only will the clean shearing action of the edges 108 function satisfactorily and cleanly with heavy gauges, but also with quite brittle materials which open dies with their crushing action cannot handle.

The formation of sharp corners is accomplished by an over run 110 with an enlarged anchor lug 111 all nicely fitted into the laminations 100 and faced smooth. This construction is important for accuracy and long life. It prevents bursting of the female die and helps maintain the die so it can be reground for continued use after a series of runs have dulled the edge 108.

Rubber ejectors are shown at 112 and may be combined with other ejection means mentioned above. The rubber ejectors 112 are not used to grip the stock when stamping as it is not necessary to grip the sheet or to lock it. They do speed up the stamping operation in a regular press on production runs.

I claim:

1. A press tool for blanking articles from sheet material comprising in combination a male die part, a female die part, portions of said die parts being of such respective thicknesses as to combine to form the required complementary male and female shapes and metal strips members forming facings and shear edges for said shapes and being held in position between and completely separating said portions, one of said strip members extending beyond and overlapping another of said strip members, where sharp bends occur in said shapes, to form said bends, the overlap extension being anchored and secured in the body of the die part beyond and adjacent said bend.

2. A press tool for blanking articles from sheet material comprising in combination a male die part, a female die part, hard plywood portions of said die parts being of such respective thicknesses as to combine to form the required complementary male and female closed designs and hardened steel strip members forming facings and shear edges for said closed designs and being held in position between and separating said hard plywood portions, one of said strip members extending beyond another of said strip members, where sharp bends occur in said shapes, to form said bends, the extension being secured in the body of the die part beyond and adjacent said bend.

3. A press tool for blanking articles from sheet material comprising in combination a male die part, a female die part, separated portions of said die parts being of such respective thicknesses as to combine to form the required complementary male and female shapes, strip members forming facings and shear edges for said shapes and being held in position between said separated portions, a punch on said male die part and location pin on said female die part, said punch and location pin being of like diameter and so positioned adjacent the periphery of the die parts that the punch serves to form a notch in the sheet material during a blanking operation which, when engaged on said location pin, locates said sheet material for the next subsequent blanking operation, one of said strip members forming a T joint with another of said members, where sharp bends occur on said shapes, to form said bends, the extension of said T being secured in the body of the die part beyond and adjacent said bend.

4. A press tool for blanking articles from sheet material comprising in combination a male die part, a female die part, separated portions of said die parts being of such respective thicknesses as to combine to form the required complementary male and female shapes, metal strip members forming facings and shear edges for said shapes and being held firmly in position between and separating portions, a punch on said male die part and a location pin and a feed peg on said female die part, said punch and location pin being of like diameter and so positioned adjacent the periphery of the die parts that the punch serves to form a notch in the sheet material during a blanking operation which, when engaged on said location pin, locates said sheet material for the next subsequent blanking operation, whilst said feed peg is so disposed upon said female as to necessitate temporary disalignment of said sheet material before it can be forwarded for the next subsequent blanking operation, one of said strip members over-lapping another of said strip members, where sharp bends occur in said shapes, to form said bends, the end of the overlapped strip member having an enlarged portion secured in the body of the die part beyond and adjacent said bend.

5. A press tool for shear die blanking of articles from sheet material comprising in combination a male die part, a female die part, separate and discrete hard plywood portions of said die parts being of such respective thicknesses as to combine to form the required complementary male and female closed designs, substantially flush ground hardened steel strip members forming facings and shear edges for said closed designs and being held in position between said discrete hard plywood portions, a punch on said male die part, and a location pin on said female die part, said punch and location pin being of like diameter and so positioned on the inner side of said parts and near an edge thereof so that the punch serves to form a notch in the sheet material during a blanking operation which, when engaged on said pin, locates the material for the next subsequent blanking operation, one of said strip members overlapping another of said strip members, where sharp bends occur in said shapes, to form said bends, the overlap having an enlarged end secured in the body of the die part beyond and adjacent said bend.

References Cited in the file of this patent

UNITED STATES PATENTS

| 114,121 | Fisk et al. | Apr. 25, 1871 |
| 683,999 | Seiger et al. | Oct. 8, 1901 |
| 964,061 | Schwaber | July 12, 1910 |
| 1,167,976 | Campbell | Jan. 11, 1916 |
| 1,206,252 | Rignev | Nov. 28, 1916 |
| 2,101,458 | Sachtleben | Dec. 7, 1937 |
| 2,537,540 | Messenger | Jan. 9, 1951 |

FOREIGN PATENTS

| 115,266 | Sweden | Oct. 30, 1945 |
| 126,836 | Australia | Feb. 13, 1948 |
| 606,984 | Great Britain | Aug. 24, 1948 |